(12) United States Patent
Okuda et al.

(10) Patent No.: US 9,318,747 B2
(45) Date of Patent: Apr. 19, 2016

(54) ELECTRODE AND POWER STORAGE DEVICE COMPRISING SAID ELECTRODE

(71) Applicant: KABUSHIKI KAISHA TOYOTA JIDOSHOKKI, Kariya-shi, Aichi-ken (JP)

(72) Inventors: Motoaki Okuda, Kariya (JP); Taichi Nakamizo, Kariya (JP); Kyoichi Kinoshita, Kariya (JP); Masami Tomioka, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 90 days.

(21) Appl. No.: 14/379,201

(22) PCT Filed: Feb. 15, 2013

(86) PCT No.: PCT/JP2013/053744
§ 371 (c)(1),
(2) Date: Aug. 15, 2014

(87) PCT Pub. No.: WO2013/125467
PCT Pub. Date: Aug. 29, 2013

(65) Prior Publication Data
US 2015/0024243 A1    Jan. 22, 2015

(30) Foreign Application Priority Data
Feb. 22, 2012    (JP) .................................. 2012-036483

(51) Int. Cl.
*H01M 4/70*    (2006.01)
*H01M 4/04*    (2006.01)
*H01M 4/139*    (2010.01)
(Continued)

(52) U.S. Cl.
CPC .............. *H01M 4/70* (2013.01); *H01M 4/0404* (2013.01); *H01M 4/0435* (2013.01); *H01M 4/139* (2013.01); *H01M 4/1391* (2013.01); *H01M 2004/027* (2013.01); *H01M 2004/028* (2013.01)

(58) Field of Classification Search
CPC ........... H01M 4/02; H01M 4/66; H01M 4/70; H01M 2004/027; H01M 2004/028; H01M 10/04; H01M 10/0585; H01M 10/0587
See application file for complete search history.

(56) References Cited

FOREIGN PATENT DOCUMENTS

| JP | 2006-269242 A | 10/2006 |
|----|---------------|---------|
| JP | 2008-21415 A  | 1/2008  |
| JP | 2008-103098 A | 5/2008  |

(Continued)

OTHER PUBLICATIONS

International Search Report of PCT/JP2013/053744, dated May 7, 2013. [PCT/ISA/210] English Translation.

(Continued)

*Primary Examiner* — Brittany Raymond
(74) *Attorney, Agent, or Firm* — Sughrue Mion, PLLC

(57) ABSTRACT

This electrode is provided with a thin metal sheet and an active substance layer containing, on the surface of the thin metal sheet, multiple active substance particles of a prescribed average particle diameter. The surface of the thin metal sheet includes a forming region where the active substance layer is located. In the forming region, the thin metal sheet has a depressed section in the surface. A portion of the active substance particles is present in at least a part of the depression, and the average distance between the centers of two neighboring particles of these active substance particles present in at least a part of the depression is 60-98% of the aforementioned average particle diameter.

8 Claims, 4 Drawing Sheets

(51) Int. Cl.
*H01M 4/02* (2006.01)
*H01M 4/1391* (2010.01)

(56) References Cited

FOREIGN PATENT DOCUMENTS

| | | |
|---|---|---|
| JP | 2009-59659 A | 3/2009 |
| JP | 2010-67581 A | 3/2010 |
| JP | 2012-94463 A | 5/2012 |
| JP | 2012-216532 A | 11/2012 |

OTHER PUBLICATIONS

International Preliminary Report on Patentability dated Aug. 26, 2014, issued by the International Searching Authority in International Application No. PCT/JP2013/053744.

ELECTRODE AND POWER STORAGE DEVICE COMPRISING SAID ELECTRODE

CROSS REFERENCE TO RELATED APPLICATIONS

This application is a National Stage of International Application No. PCT/JP2013/053744 filed Feb. 15, 2013, claiming priority based on Japanese Patent Application No. 2012-036483, filed Feb. 22, 2012, the contents of all of which are incorporated herein by reference in their entirety.

Applicants provide herein a Substitute Specification under 37 C.F.R. §1.125(a). In accordance with 37 C.F.R. §1.125(b)(1), the undersigned states that the Substitute Specification contains no new matter. In accordance with 37 C.F.R. §1.125(b)(2), a redline copy of the original specification showing the amendments thereto is attached to this Amendment. In accordance with 37 C.F.R. §1.125(c), a clean copy of the Substitute Specification is attached to this Amendment. Entry of the Substitute Specification is requested.

FIELD OF THE INVENTION

The present invention relates to an electrode and a power storage device that includes the electrode.

BACKGROUND OF THE INVENTION

In the prior art, a lithium-ion rechargeable battery and a nickel-metal hydride rechargeable battery each are well known as, for example, a power storage device installed in a vehicle. For example, in a lithium-ion rechargeable battery, an electrode assembly, which is formed by stacking or winding electrode sheets (electrodes), is accommodated in a case. The electrode sheet includes a thin metal plate. A surface of the thin metal plate includes an active material layer that includes active material particles.

Patent document 1 describes a lithium-ion rechargeable battery that increases the delamination resistance (adhesion strength) of the active material layer with respect to the thin metal. In the rechargeable battery, a paste including the active material particles (active material mixture) is applied to the thin metal plate and dried. Then, the dried paste undergoes a pressing process. In the method for manufacturing an electrode plate described in patent document 1, in a drying process, solvent vapor with a high temperature is provided to facilitate the melting of a binder. The binder strengthens the adhesion between the active material layer and the thin metal plate. This improves delamination resistance.

PRIOR ART DOCUMENT

Patent Document

Patent Document 1: Japanese Laid-Open Patent Publication No. 2008-103098

SUMMARY OF THE INVENTION

A power storage device such as a rechargeable battery is, for example, installed in a vehicle, and often used in a repeatedly vibrated environment. It is desirable that the delamination resistance between the thin metal plate and the active material layer be further increased to improve vibration resistance.

It is an object of the present invention to provide an electrode that inhibits delamination of an active material layer from a thin metal plate and a power storage device that includes the electrode.

To achieve the above object, the first aspect of the present invention provides an electrode that includes a thin metal plate and an active material layer that includes a plurality of active material particles, which have a predetermined average particle diameter, in a surface of the thin metal plate. The surface of the thin metal plate includes a formation region where the active material layer is located. The surface of the thin metal plate includes cavities in the formation region. Some of the active material particles are at least partially received in the cavities. Among the active material particles that are at least partially received in the cavities, an average distance between centers of two adjacent ones of the active material particles is 60% or greater and 98% or less of the average particle diameter.

The second aspect of the present invention provides an electrode that includes a thin metal plate and an active material layer that includes a plurality of active material particles, which have a predetermined average particle diameter, in a surface of the thin metal plate. The surface of the thin metal plate includes a formation region where the active material layer is located. Some of the active material particles are at least partially embedded in the formation region. Among the active material particles that are at least partially embedded in the formation region, an average distance between centers of two adjacent ones of the active material particles is 60% or greater and 98% or less of the average particle diameter.

The third aspect of the present invention provides a power storage device that includes an electrode assembly. The electrode assembly includes two or more electrodes and a sheet-like separator located between the electrodes. Each of the electrodes includes a thin metal plate and an active material layer, which includes a plurality of active material particles. The active material particles are formed on a surface of the thin metal plate and have a predetermined average particle diameter. The electrode assembly has a layered structure in which the electrodes and the separator are stacked or wound. In at least one of the two or more electrodes, the surface of the thin metal plate includes a formation region where the active material layer is located. Some of the active material particles are active material particles that are at least partially embedded in the formation region. Among the active material particles that are at least partially embedded in the formation region, an average distance between centers of two adjacent ones of the active material particles is 60% or greater and 98% or less of the average particle diameter.

Regarding each of the above aspects, the active material particles located on the surface of the thin metal plate are at least partially embedded in the cavity. Among the active material particles that are at least partially received in the cavities, an average distance between centers of two adjacent ones of the active material particles is 60% or greater and 98% or less of the average particle diameter. Among the active material particles that are at least partially received in the cavity of the thin metal plate, when the average distance between centers of two adjacent active material particles is greater than or equal to 60% of the average particle diameter, the active material particles suitably adhere to the thin metal plate with the binder in comparison with when the average distance is less than 60%. This improves the delamination resistance of the active material particles. When the average distance is less than or equal to 98% of the average particle diameter, a gap between the active material particles, which are at least partially received in the cavity, is decreased in comparison with when the average distance exceeds 98%. This enhances the anchor effect and increases delamination resistance. Accordingly, delamination of the active material layer from the thin metal plate may be inhibited.

DETAILED DESCRIPTION OF THE PREFERRED EMBODIMENTS

One embodiment of the present invention will now be described with reference to FIGS. 1 to 4.

Figure 1:
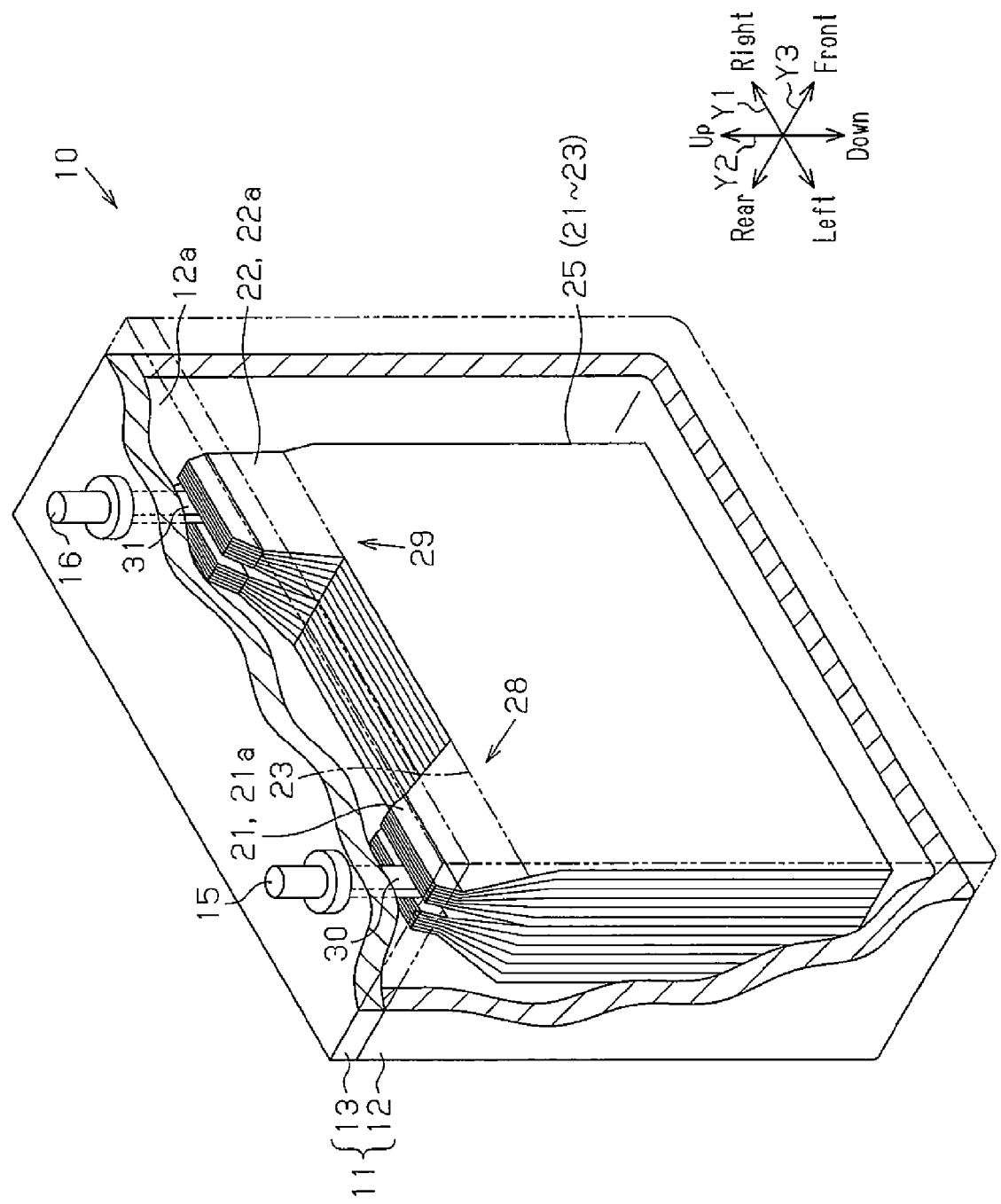
FIG. 1 is a schematic perspective view of a rechargeable battery including an electrode according to one embodiment of the present invention.
Figure 3:
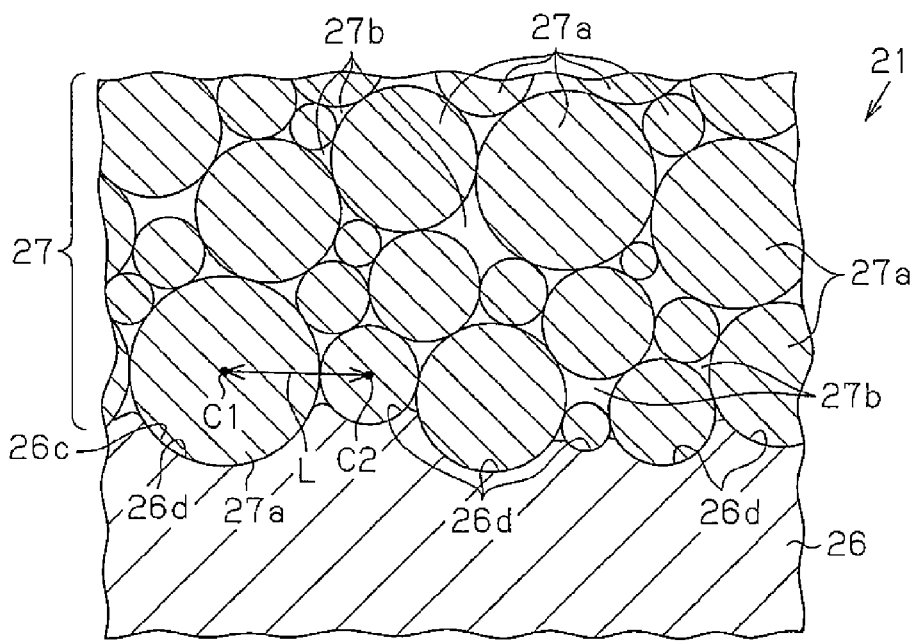
FIG. 3 is a schematic diagram showing a cross-sectional surface of a positive electrode sheet observed with a scanning electron microscope.

As shown in FIG. 1, a rechargeable battery 10, which serves as a power storage device, is installed in a vehicle such as an industrial vehicle or a passenger vehicle. The rechargeable battery 10 includes a case 11, which has a generally cuboid shape and has a low profile as a whole. The case 11 includes a main body member 12, which is tubular and includes a closed end (tetragonal tube in the present embodiment), and a plate-like (tetragonal plate-like in the present embodiment) cover member 13. The cover member 13 is coupled to the main body member 12 to seal an opening 12a of the main body member 12. The main body member 12 and the cover member 13 are each formed from a metal (for example, stainless steel or aluminum). Hereinafter, in the present description, the longitudinal direction of the case 11 indicated by arrow Y1 is defined as a left-right direction or a lateral direction. The heightwise direction of the case 11 indicated by arrow Y2 is defined as an up-down direction or a vertical direction. The direction parallel to the short sides of the case 11 indicated by arrow Y3 in FIG. 3 is defined as a front-rear direction.

A generally cylindrical positive terminal 15 and negative terminal 16 protrude from an outer surface (upper surface) of the cover member 13. The positive terminal 15 and the negative terminal 16 are insulated from the case 11 (main body member 12 and cover member 13).

An electrode assembly 25 is accommodated in the case 11 (main body member 12). The electrode assembly 25 has a structure in which a positive electrode sheet 21 serving as an electrode is stacked on a negative electrode sheet 22 serving as an electrode, with a sheet-like separator 23 (partition) located in between. The electrode assembly 25 has a generally cuboid shape elongated in the lateral direction. The separator 23, which is formed from an insulative resin material, is a tetragonal porous sheet having an extremely fine porous structure. The electrode assembly 25 accommodated in the case 11 is covered with an insulation bag, which is an insulation material and is not shown in the drawings. The case 11 is filled with an electrolyte (electrolytic solution) in accordance with the type of the rechargeable battery 10, for example, a lithium-ion rechargeable battery or a nickel-metal hydride rechargeable battery.

Figure 2:
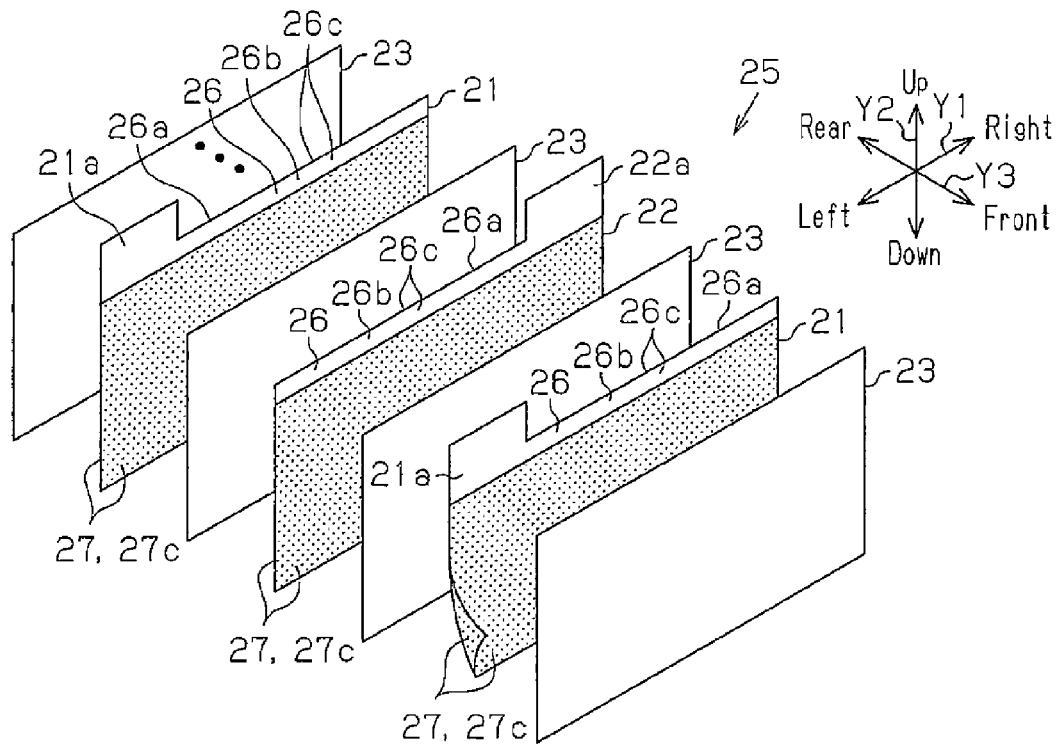
FIG. 2 is a schematic exploded perspective view of an electrode assembly.

As shown in FIG. 2, the positive electrode sheet 21 and the negative electrode sheet 22 each include a tetragonal sheet-like metal foil 26 serving as a thin metal plate. The thickness of the metal foil 26 is, for example, 10 micrometers or greater and 50 micrometers or less, more preferably, 15 micrometers or greater and 25 micrometers or less. The metal foil 26 is formed from a metal selected in accordance with the type of the rechargeable battery 10, for example, a lithium-ion rechargeable battery or a nickel-metal hydride rechargeable battery. The metal used for the metal foil 26 differs between the positive electrode sheet 21 and the negative electrode sheet 22. In the present embodiment, the metal foil 26 of the positive electrode sheet 21 is formed from aluminum, and the metal foil 26 of the negative electrode sheet 22 is formed from copper.

An active material mixture including active material particles is applied entirely to the surfaces 26c (both front surface and rear surface) of each metal foil 26 excluding a non-formation region 26b (uncoated portion), which extends throughout the entire width in the lateral direction over a constant width from an upper side 26a (upper edge). The positive electrode sheet 21 and the negative electrode sheet 22 each extend along the metal foil 26 from one end of the surface 26c to the other end and include the active material layer 27, which includes the active material particles. Thus, the non-formation region 26b is where the active material layer 27 is not formed and extends along the upper side 26a of the metal foil 26. The active material mixture and the active material layer 27 will be described later in detail.

At the left side of the upper side 26a of each positive electrode sheet 21, a generally tetragonal positive electrode lead 21a, in which the non-formation region 26b has undergone a punching process, extends upward (toward the cover member 13). At the right side of the upper side 26a of each negative electrode sheet 22, a generally tetragonal negative electrode lead 22a, in which the non-formation region 26b has undergone a punching process, extends upward (toward the cover member 13). Thus, the positive electrode lead 21a and the negative electrode lead 22a do not include the active material layer 27.

In the electrode assembly 25, the positive electrode sheet 21 and the negative electrode sheet 22, which have the separator 23 between, are stacked in the front-rear direction (thickness direction). More specifically, in the electrode assembly 25, the positive electrode sheet 21 and the negative electrode sheet 22 are alternately arranged by stacking a positive electrode sheet 21, a negative electrode sheet 22, a positive electrode sheet 21, and so on. In the present embodiment, the front-rear direction, which is indicated by the arrow Y3, is the stacking direction of the electrode assembly 25 (positive electrode sheet 21 and negative electrode sheet 22).

In this manner, as shown in FIG. 1, in the electrode assembly 25, at the left side of upper side 26a, a plurality of the positive electrode leads 21a, without the separators 23 arranged in between, form a positive electrode current collection portion 28 that extends upward and serves as a current collection portion forming a lamination structure. In the electrode assembly 25, at the right side of the upper side 26a, a plurality of the negative electrode leads 22a, without the separators 23 arranged in between, form a negative electrode current collection portion 29 that serves as a current collection portion forming a lamination structure.

The positive electrode current collection portion 28 (positive electrode lead 21a) and the positive terminal 15 are electrically connected by a positive electrode current collection terminal 30, which serves as a current collection member. The negative electrode current collection portion 29 (negative electrode lead 22a) and the negative terminal 16 are electrically connected by a negative electrode current collection terminal 31, which serves as a current collection member.

The active material layer 27 that is formed on the surface 26c of the metal foil 26 in each of the positive electrode sheet 21 and the negative electrode sheet 22 will now be described in detail.

As shown in FIG. 3, the active material layer 27 on the surface 26c of each metal foil 26 includes active material particles 27a, a binder 27b, and a conductive agent (conductive assistant agent). The conductive agent is dispersed in the binder 27b. In the present embodiment, in the active material mixture applied to the metal foil 26 of the positive electrode sheet 21, $LiNi_{1/3}Mn_{1/3}Co_{1/3}O_2$ is used as a positive electrode active material that forms the active material particles 27a, polyvinylidene fluoride (hereinafter referred to as PVDF) is used as the binder 27b, and acetylene black is used as the conductive agent. In the active material mixture applied to the metal foil 26 of the negative electrode sheet 22, carbon is used as a negative electrode active material that forms the active material particles 27a, PVDF is used as the binder 27b, and acetylene black is used as the conductive agent.

In the active material layer 27 on the surface 26c of the metal foil 26 of the positive electrode sheet 21, the average particle diameter of the active material particle 27a is, for example, 5 micrometers or greater and 14 micrometers or less, more preferably, 5 micrometers or greater and 10 micrometers or less. The "average particle diameter" in the present description indicates the particle diameter in particle size distribution that is obtained using a laser diffraction and scattering process where the integrated value is 50%. An individual "particle diameter" of the active material particle 27a indicates the particle diameter observed with a scanning electron microscope (SEM).

In a formation region 27c of the active material layer 27 on the positive electrode sheet 21, the active material particles 27a located on the surface 26c of the metal foil 26 are at least partially received in the cavities 26d. That is, in the formation region 27c of the active material layer 27, among the active material particles 27a, the active material particle 27a that contacts the surface 26c of the metal foil 26 is embedded so that portions of the active material particles 27a are received in cavities 26d in the surface 26c. In other words, at least a portion of the active material particle 27a is forced into, that is, is buried into, a surface portion including the surface 26c of the metal foil 26. The remaining portion of the active material particle 27a protrudes from the surface 26c of the metal foil 26.

When the active material particles 27a included in the active material layer 27 have an average particle diameter represented by 100%, among the active material particles 27a that are partially received in the cavities 26d in the surface 26c of the metal foil 26, an average of distance L between the centers C1 and C2 of two adjacent active material particles 27a (average distance between centers) is preferably 60% or greater and 98% or less, more preferably, 75% or greater and 90% or less.

Hereinafter, the ratio of the average of distance L between the center C1 and the center C2 (average distance between centers) relative to the average particle diameter is simply defined as the "average inter-particle distance." In the present description, the "center of the active material particle 27a" indicates the middle, when observed with a scanning electron microscope, in a direction extending along the surface of the metal foil 26 and a direction orthogonal to the surface of the metal foil 26.

The density of the positive electrode sheet 21 (electrode density) is 2.70 g/cm$^3$ when the average inter-particle distance is 98% and is 3.45 g/cm$^3$ when the average inter-particle distance is 60%. Additionally, the density of the positive electrode sheet 21 (electrode density) is 3.15 g/cm$^3$ when the average inter-particle distance is 75%. In the active material layer 27 on the positive electrode sheet 21, among the active material particles 27a that are partially received in the cavities 26d of the surface 26c of the metal foil 26, the active material particle 27a of which diameter is greater than or equal to the average particle diameter received in a cavity 26d of the metal foil 26 to a depth of at most 50% of the diameter of the active material particle 27a. That is, the active material particle 27a of which diameter is greater than or equal to the average particle diameter is buried in the metal foil 26 in such a manner that the buried portion of the active material particle 27a does not exceed 50% of the particle diameter. In the negative electrode sheet 22 of the present embodiment, in the formation region 27c of the active material layer 27, the active material particle 27a is not forced into the surface 26c of the metal foil 26.

A method for manufacturing the rechargeable battery 10 that includes the positive electrode sheet 21 and the negative electrode sheet 22 will now be described.

First, a preparation process is performed. In the preparation process, the active material particles 27a, the conductive agent, the binder 27b, and a solvent (for example, water) are mixed to obtain a paste of active material agent. Next, an application process is performed. In the application process, the paste of active material agent obtained in the preparation process is applied, with uniform thickness, to the surfaces 26c (both surfaces) of the strip (elongated sheet) of metal foil 26 obtained in a process differing from the preparation process. The uniform thickness is, for example, 143 micrometers or greater and 315 micrometers or less including the 20 micrometers of an aluminum metal foil. The application process forms the non-formation region 26b, which has a constant width throughout the longitudinal direction that is free from the active material mixture, on one widthwise side (edge) of the metal foil 26.

Subsequently, a drying process is performed. In the drying process, the metal foil 26, to which the active material mixture is applied, is passed through a dryer (drying oven) to remove the solvent from the active material mixture (active material layer 27). Next, a pressing process is performed. In the pressing process, the dried metal foil 26 is passed through a roll press machine to compress the active material layer 27 and increase the density and smoothness of the active material layer 27. The roll press machine compresses, that is, presses, the active material layer 27 in such a manner that the metal foil 26, which includes the active material layer 27 formed on the surface 26c, is passed through a clearance formed between two parallel cylindrical rollers.

When manufacturing the negative electrode sheet 22, in the pressing process, the linear pressure provided from the rollers of the roll press machine is set to such a value that the active material particle 27a included in the active material layer 27 is not forced into the surface 26c of the metal foil 26. After undergoing the pressing process, the strip-like (elongated sheet-like) negative electrode sheet 22 is obtained.

When manufacturing the positive electrode sheet 21, in the pressing process, a linear pressure provided from the rollers of the roll press machine is set to such a value that the active material particle 27a included in the active material layer 27 is forced into the surface 26c (surface portion) of the metal foil 26. Additionally, in the pressing process, the linear pressure is set to such a value that the average inter-particle distance is, preferably, 60% or greater and 98% or less of the average particle diameter of the active material particle 27a included in the active material layer 27, more preferably, 75% or greater and 90% or less. Regarding the active material layer 27 of the positive electrode sheet 21, in the pressing process, the linear pressure is set to such a value that, among the active material particles 27a that are partially received in the cavities 26d in the surface 26c of the metal foil 26, the active material particle 27a, of which diameter is greater than or equal to the average particle diameter, is forced into the metal foil 26 to a depth of at most 50% of the diameter of the active material particle 27a. That is, the positive electrode active material particle 27a is pressed with a greater liner pressure than that applied to the positive electrode active material particle 27a. This allows for the positive electrode active material particle 27a to be partially received in the cavities 26d formed in the surface of the metal foil 26. After undergoing the pressing process, the strip-like (elongated sheet-like) positive electrode sheet 21 is obtained.

Next, the strips of the positive electrode sheet 21 and the negative electrode sheet 22 each undergo the punching process to form the generally tetragonal positive electrode sheet 21 and negative electrode sheet 22. The positive electrode sheet 21 and the negative electrode sheet 22, which are located on opposite sides of the separator 23, are stacked to form the electrode assembly 25. This completes the electrode assembly 25.

The positive electrode current collection terminal 30 is coupled to the positive electrode current collection portion 28 (positive electrode lead 21a) of the electrode assembly 25 to establish an electrical connection. The positive terminal 15 is electrically connected to the positive electrode current collection terminal 30. The negative electrode current collection terminal 31 is electrically connected to the negative electrode current collection portion 29 (negative electrode lead 22a) of the electrode assembly 25. The negative terminal 16 is electrically connected to the negative electrode current collection terminal 31. The electrode assembly 25, which is accommodated in the insulation bag, is stored in the main body member 12. The cover member 13, from which the positive terminal 15 and the negative terminal 16 protrude, is attached to the main body member 12. Finally, the case 11 is filled with an electrolyte (electrolytic solution) to complete the rechargeable battery 10.

EXAMPLE

The above embodiment will now be specifically described using an example. However, the present invention is not limited to the description.

Specimen Production

A paste of an active material mixture is obtained by mixing $LiNi_{1/3}Mn_{1/3}Co_{1/3}O_2$ powder (average particle diameter is 9.6 micrometers, tap density is 2.54 g/cm$^3$), which is a commercially available active material particle, with acetylene black, PVDF, and water. The active material mixture includes 93 weight percent concentration of $LiNi_{1/3}Mn_{1/3}Co_{1/3}O_2$ powder.

The obtained paste active material mixture is applied to and formed on the surfaces (both surfaces) of a strip (elongated sheet) of aluminum foil. The weight per unit area of the active material mixture is set to 26 mg/cm$^2$ (thickness of 157 micrometers including 20 micrometers of the aluminum metal foil). The aluminum foil, to which the active material mixture is applied, is then passed through the dryer. This removes water from the active material mixture to dry the aluminum foil.

The dried aluminum foil is passed through the roll press machine to compress the dried active material mixture. In this process, the linear pressure provided between the rollers of the roll press machine is adjusted so that the obtained positive electrode sheets have different average inter-particle distances. The produced strips of positive electrode sheets each undergo the punching process. This produces samples, each of which has a length of 80 millimeters, and a width of 25 millimeters.

Observation with Scanning Electron Microscope

The inventors cut the obtained samples with a focused ion beam system (JEM-9310FIB manufactured by Japan Electron Optics Laboratory Co. Ltd) and observed the cross-sectional surfaces with a scanning electron microscope (S-4800 manufactured by Hitachi High-Technologies Corporation). It was observed that, in each of the produced samples, the active material particle was forced into the surface of the aluminum foil. More specifically, cavities formed in the surface of the aluminum foil, and active material particles partially received in the cavities were observed.

Visual Observation of Sample

The inventors also observed whether or not each of the obtained samples had creases or cracks in the boundary of the aluminum foil between the formation region of the active material layer (formation region 27c) and the non-formation region (non-formation region 26b).

The result showed that creases or cracks were not formed in the boundary of the aluminum foil in the samples that partially received active material particles in the aluminum foil, that is, when, among the active material particles forced into the surface of the aluminum foil, the active material particle having a diameter greater than or equal to the average particle diameter was forced into the aluminum foil to a depth of 50% or less of the diameter of the active material particle.

In contrast, creases were formed in the boundary of the aluminum foil when, among the active material particles forced into the surface of the aluminum foil, the active material particle having a diameter greater than or equal to the average particle diameter was forced into the aluminum foil to a depth exceeding 50% of the diameter of the active material particle.

It is considered, when the active material particle is buried to a depth exceeding 50% of the particle diameter of the active material particle, differences in the extension amount of the aluminum foil between the non-formation region of the active material layer, which weakly contacts the roller of the roll press machine, and the formation region of the active material layer, which contacts the roller of the roll press with a stronger force than that of the non-formation region, forms creases in the aluminum foil of the boundary portion.

Accordingly, it was determined that, preferably, in the active material layer of the positive electrode sheet, among the active material particles that were forced into the surface of the aluminum foil, the active material particle of which diameter was greater than or equal to the average particle diameter was forced into the aluminum foil to a depth of 50% or less of the active material particle.

Delamination Resistance Measurement

Delamination resistance was measured using a testing method using an adhesive tape and an adhesive sheet. In the method for measuring delamination resistance, the sample was applied to a slidably supported rectangular test bench using a commercially available strong double-faced adhesive tape (YHB Y-4945 manufactured by 3M) in such a manner that the longitudinal directions of the sample and the test bench were in conformance. The end portion of the sample in the longitudinal direction was fixed to a fixture, which was slidable in a direction orthogonal to the application surface of the sample on the test bench. A load test stand (LTS-200N-S20 manufactured by Minebea Co., Ltd.), which was coupled to the fixture, was moved at a constant speed of 20 mm/min away from the sample to measure the load that delaminated the sample from the test bench. Among the measured loads, the average value of the loads applied to a width of one centimeter in an area separated by 10 to 30 millimeters from the position where delamination was started was defined as the delamination resistance.

Figure 4:
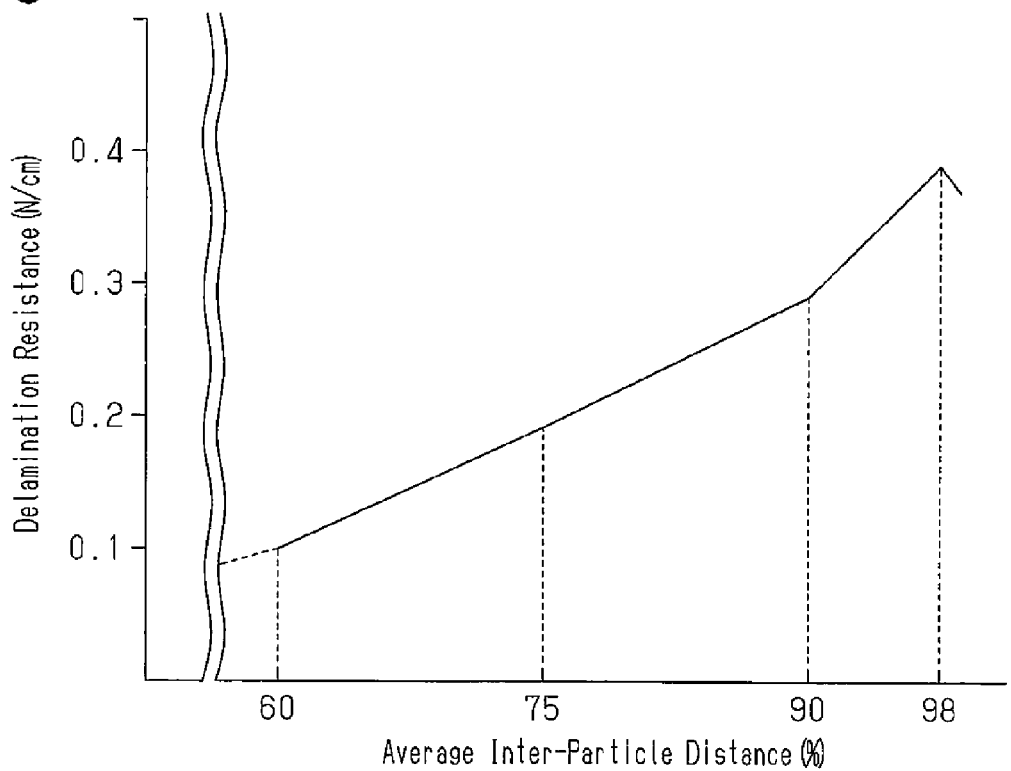
FIG. 4 is a graph showing the relationship of the average distance between particles and delamination resistance.

The result of the delamination resistance measurement shows that the delamination resistance was 0.38 N/cm when the average inter-particle distance was 98%, the delamination resistance was 0.28 N/cm when the average inter-particle distance was 90%, delamination resistance was 0.19 N/cm when the average inter-particle distance was 75%, and the delamination resistance was 0.14 N/cm when the average inter-particle distance was 60%. The graph of FIG. 4 shows the results of the delamination resistance measured using the samples that had different average inter-particle distances. As shown in FIG. 4, it was determined that, when the average inter-particle distance was less than 60%, the delamination resistance was lower than when the average inter-particle distance was greater than or equal to 60%. It was considered that an insufficient amount of the binder between the active material particles decreased the adhesion strength between the active material particle and the aluminum foil. It was determined that the delamination resistance was sufficient when the average inter-particle distance was 60%.

When the average inter-particle distance was 98%, the delamination resistance was the maximum. It was observed that the delamination resistance started decreasing when the average inter-particle distance exceeded 98%. This is considered due to a condition in which an increase in the average inter-particle distance of the active material particles that were forced into the aluminum foil, that is, received in the cavities formed in the aluminum foil, gradually decreased the anchor effect on the aluminum foil. When increasing the density of the active material particle in the active material layer to improve the energy density, it is preferable that the average inter-particle distance be set to less than or equal to 90%.

From the description above, when the average inter-particle distance is inclusively between 60% and 98%, it is determined that the delamination resistance between the active material layer and the aluminum foil is suitably improved due to the anchor effect of the active material particle on the aluminum foil in addition to adhesion of the binder.

When the average inter-particle distance is less than 75%, the active material particles are closely located. Thus, it takes a long time to impregnate the active material layer with the electrolyte. Thus, when shortening the manufacturing time of the rechargeable battery 10, it is preferred that the average inter-particle distance in the positive electrode sheet be set to be greater than or equal to 75%. When installing the rechargeable battery 10 in an industrial vehicle such as a forklift, it is preferred that the average inter-particle distance be greater than or equal to 75%, and 0.19 N/cm of the delamination resistance be maintained.

Accordingly, the present embodiment has the advantages described below.

(1) In the positive electrode sheet 21, the active material particles 27a are partially received in the cavities 26d in the surface 26c of the metal foil 26. Among the active material particles 27a partially received in the cavities 26d in the surface 26c of the metal foil 26, the average distance between the centers C1 and C2 of two adjacent active material particles 27a is 60% or greater and 98% or less of the average particle diameter. In comparison to when the average distance is less than 60% of the average particle diameter, when the average distance is greater than or equal to 60%, the active material particle 27a and the metal foil 26 are suitably bound with the binder. This improves the delamination resistance of the active material layer 27. In comparison to when the average distance exceeds 98% of the average particle diameter, when the average distance is less than or equal to 98%, the distance is smaller between the active material particles 27a that are partially received in the cavity 26d. This increases the anchor effect, improves the delamination resistance, and inhibits delamination of the active material particle 27a from the metal foil 26.

(2) When the active material particle 27a of which diameter is greater than or equal to the average particle diameter is received in the cavity 26d of the metal foil 26 to a depth of over 50% of the particle diameter of the active material particle 27a, creases are formed due to the deformation of the metal foil 26. However, in the present embodiment, the active material particle 27a of which diameter is greater than or equal to the average particle diameter is received in the cavity 26d to a depth of 50% or less of the particle diameter of the active material particle 27a. This suitably inhibits the formation of creases on the metal foil 26.

(3) The metal foil 26 of the positive electrode sheet 21 is formed from aluminum. The active material layer 27 includes the positive electrode active material particle 27a. Thus, in the positive electrode sheet 21, delamination of the active material layer 27 from the metal foil 26 may be inhibited.

(4) In the electrode assembly 25, the positive electrode sheet 21 and the negative electrode sheet 22, located on opposite sides of the separator 23, are stacked. The positive electrode sheet 21 and the negative electrode sheet 22 form a layered structure. Thus, in the electrode assembly 25 in which the positive electrode sheet 21 and the negative electrode sheet 22 form a layered structure, delamination of the active material layer 27 from the metal foil 26 of the positive electrode sheet 21 may be inhibited.

(5) Delamination of the active material layer 27 from the metal foil 26 of the positive electrode sheet 21, which forms the electrode assembly 25, is inhibited. This improves the durability of the rechargeable battery 10 that includes electrode assembly 25.

(6) The average inter-particle distance of the active material layer 27 on the positive electrode sheet 21 is set to be greater than or equal to 75%. This avoids lengthening of the time used to impregnate the active material layer 27 with the electrolyte (electrolytic solution).

(7) The average inter-particle distance of the active material layer 27 on the positive electrode sheet 21 is set to be greater than or equal to 75%. This inhibits delamination of the active material layer 27 from the metal foil 26 even under a condition in which a large vibration is applied to the rechargeable battery 10 such as when installed in an industrial vehicle.

Embodiments are not limited to the foregoing description. For example, embodiments may be realized as follows.

Figure 5:
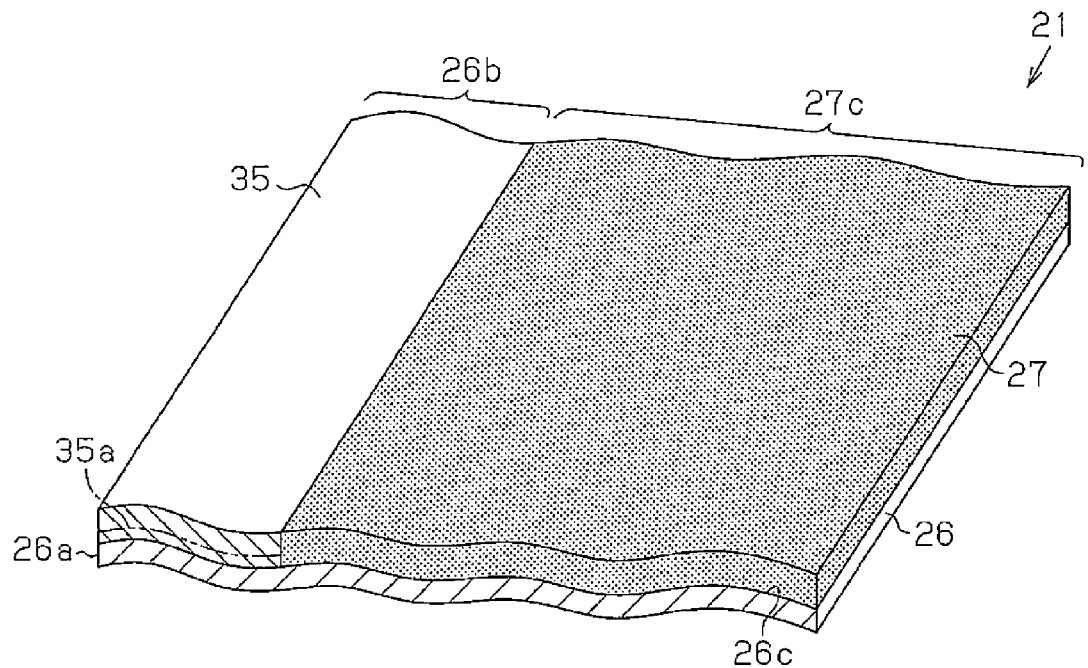
FIG. 5 is schematic diagram showing an electrode sheet according to another embodiment.

As shown in FIG. 5, on the surface 26c of the metal foil 26 of the positive electrode sheet 21, the non-formation region 26b, which does not include the active material layer 27, may be attached to an auxiliary metal foil 35, which is formed from the same metal as the metal foil 26 and serves as an auxiliary thin metal plate. Preferably, the auxiliary metal foil 35 is attached to the metal foil 26 by, for example, seam welding, which is a type of resistance welding. Preferably, in this case, thickness of the auxiliary metal foil 35 is set to be approximately the same as that of the active material layer 27. In this manner, the auxiliary metal foil 35 is attached to the non-formation region 26b, which does not include the active material layer 27. This inhibits the generation of creases on the metal foil 26 when a pressure is applied to the formation region 27c of the active material layer 27 using, for example, a press machine, so that the cavity 26d is formed and the active material particle 27a is partially received in the cavity 26d.

As shown in FIG. 5 with a long dashed double-short dashed line, the auxiliary metal foil 35 and the metal foil 26, which have a sheet 35a in between, may be attached together. In this case, the sheet 35a is formed from a metal of which electric resistance is greater than those of metals that are used to form the auxiliary metal foil 35 and the metal foil 26. This facilitates resistance welding between the auxiliary metal foil 35 and the metal foil 26.

As shown in FIG. 5, only one surface of the metal foil 26 may include the active material layer 27.

Figure 6:
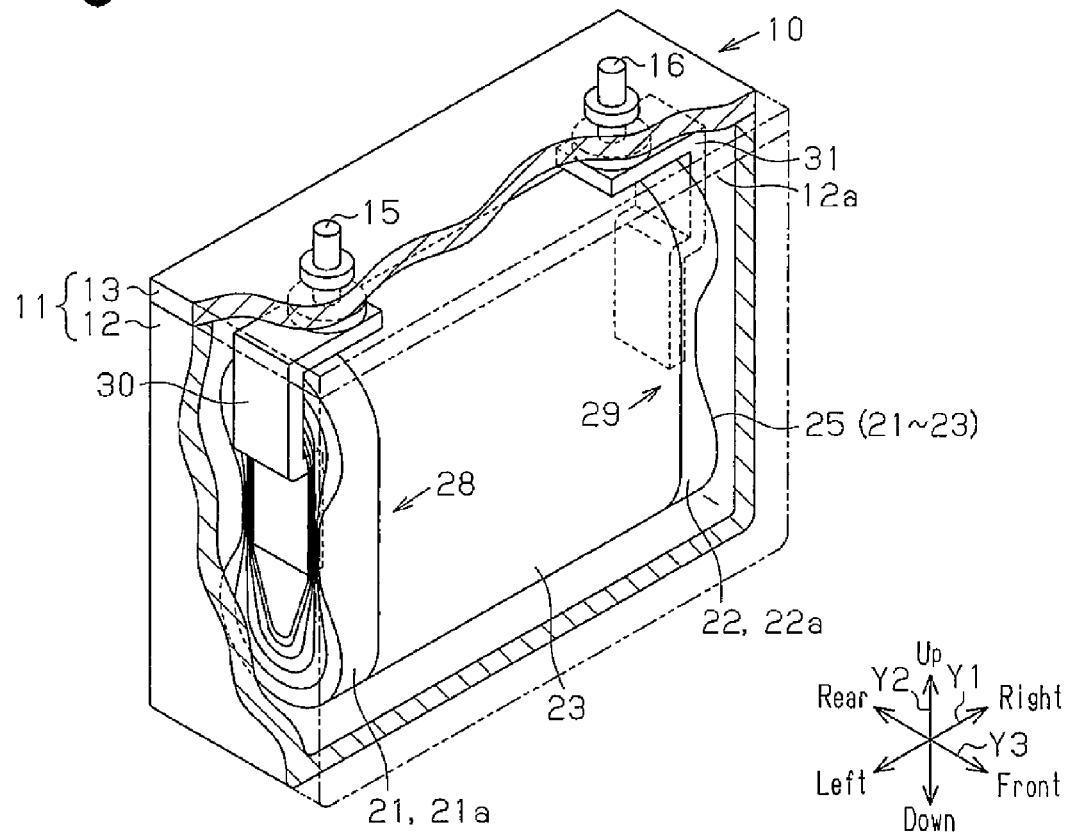
FIG. 6 is a schematic perspective view of a rechargeable battery according to another embodiment.
Figure 7:
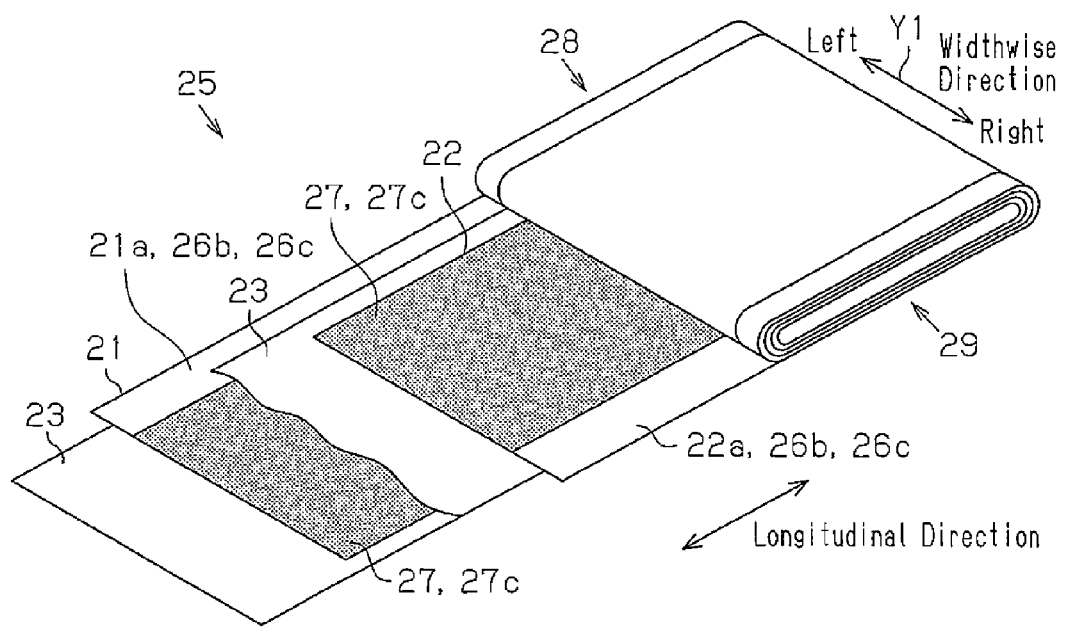
FIG. 7 is a schematic exploded perspective view of an electrode assembly according to another embodiment.

As shown in FIGS. 6 and 7, in the electrode assembly 25, the positive electrode sheet 21, the negative electrode sheet 22, and the separator 23 may have strip-like (elongated sheet-like) shapes. The positive electrode sheet 21 and the negative electrode sheet 22, which have the separator 23 between, are wound in a rolled manner. This forms the electrode assembly 25 that includes a layered structure (lamination structure) of the positive electrode sheet 21 and the negative electrode sheet 22. In this case, in the positive electrode sheet 21, one edge portion (in another embodiment of the present invention, left edge portion) in the widthwise direction (lateral direction) includes the non-formation region 26b, which extends in the longitudinal direction of the positive electrode sheet 21. The non-formation region 26b serves as the positive electrode lead 21a. In the negative electrode sheet 22, the other edge portion (in another embodiment of the present embodiment, right edge portion) in the widthwise direction includes the non-formation region 26b, which extends in the longitudinal direction of the negative electrode sheet 22. This non-formation region 26b serves as the negative electrode lead 22a. Then, the positive electrode sheet 21 and the negative electrode sheet 22 are wound. The left edge portion of the electrode assembly 25 may include the positive electrode current collection portion 28 having a layered structure of the positive electrode sheet 21, as the right edge portion of the electrode assembly 25 may include the negative electrode current collection portion 29 having a layered structure of the negative electrode sheet 22.

The electrode assembly 25 may be formed by stacking the positive electrode sheet 21 and the negative electrode sheet 22, which are located on opposite sides of the separator 23 and folded into an accordion-like shape.

In addition to or instead of the positive electrode sheet 21, the surface of the metal foil 26 that forms the negative electrode sheet 22 may include the cavity 26d, and the active material particle 27a may be partially received in the cavity 26d. In other words, the active material particle 27a may be forced into the surface 26c of the metal foil 26. Thus, in the negative electrode sheet 22, delamination of the active material layer 27 from the metal foil 26 may be inhibited.

The metal foil 26 is employed as a thin metal plate (metal sheet). However, instead of the metal foil 26, a thin plate that has sufficient thickness for maintaining a battery capacity and has no influence when manufacturing a battery may be used.

The metal foil 26 and the auxiliary metal foil 35, which are used for the positive electrode sheet 21, may be aluminum alloy. Alternatively, the metal foil 26 and the auxiliary metal foil 35 may be formed from different metals such as nickel and stainless steel. In the same manner, in the negative electrode sheet 22, the metal used to form the metal foil 26 may be modified.

The metal foil 26 used for the negative electrode sheet 22 may be copper alloy.

In the positive electrode sheet 21 and the negative electrode sheet 22, substances of the active material particle, the conductive agent, the binder that form the active material layer 27 may be modified.

Among the active material particles 27a that are partially received in the cavities 26d in the surface 26c of the metal foil 26, the active material particles 27a of which diameters are greater than or equal to the average particle diameter may be received in the cavities 26d, that is, be forced into the metal foil 26, in a depth of 50% or less of the particle diameter of the active material particle 27a. However, to inhibiting the formation of creases in the metal foil 26, the structure of the above embodiment is preferable.

The number of the positive electrode sheet 21 and the negative electrode sheet 22, which form the electrode assembly 25, may be modified. For example, the electrode assembly 25 may include a single positive electrode sheet 21 and a single negative electrode sheet 22.

The shape of the case 11 may be cylindrical or elliptic cylindrical that is elongated in the lateral direction.

The rechargeable battery 10 of the above embodiment may be installed in a vehicle (for example, an industrial vehicle or a passenger vehicle). In this case, a compressor for the air conditioner, an electric motor used to drive the wheels, and electric components such as an automotive navigation system may be driven with electric power supplied from the rechargeable battery 10 as the rechargeable battery 10 is charged by a power generator installed in the vehicle. This inhibits delamination of the active material particle 27a from the metal foil 26 and improves the durability of the rechargeable battery 10. Accordingly, the replacement cycle of the rechargeable battery 10 from a vehicle is not shortened.

The invention claimed is:

1. A positive electrode comprising:
   a thin metal plate; and
   an active material layer on a surface of the thin metal plate, wherein the active material layer includes a plurality of active material particles that have a predetermined average particle diameter, wherein
   the surface of the thin metal plate includes a formation region where the active material layer is located, the surface of the thin metal plate includes cavities in the formation region, some of the active material particles are at least partially received in the cavities, and
   among the active material particles that are at least partially received in the cavities, an average distance between centers of two adjacent ones of the active material particles is 60% or greater and 98% or less of the average particle diameter.

2. The positive electrode according to claim 1, wherein among the active material particles that are at least partially received in the cavities, an active material particle of which diameter is greater than or equal to the average particle diameter is forced into and received in the corresponding cavity embedded to a depth of 50% or less of the particle diameter of the active material particles.

3. The positive electrode according to claim 1, wherein the surface of the thin metal plate includes a non-formation region that is free from the active material particles, and the non-formation region includes an auxiliary thin metal plate formed from the same metal as the thin metal plate and attached to the non-formation region.

4. The positive electrode according to claim 1, wherein the thin metal plate is formed from aluminum, and the active material particles are active material particles used for a positive electrode.

5. The positive electrode according to claim 1, wherein the thin metal plate is formed from copper, and the active material particles are active material particles used for a negative electrode.

6. A positive electrode comprising:
a thin metal plate; and
an active material layer on a surface of the thin metal plate, wherein the active material layer includes a plurality of active material particles that have a predetermined average particle diameter, wherein
the surface of the thin metal plate includes a formation region where the active material layer is located,
some of the active material particles are at least partially embedded in the formation region,
among the active material particles that are at least partially embedded in the formation region, an average distance between centers of two adjacent ones of the active material particles is 60% or greater and 98% or less of the average particle diameter.

7. The positive electrode according to claim 6, wherein among the active material particles that are at least partially embedded in the formation region, an active material particle of which diameter is greater than or equal to the average particle diameter is embedded to a depth of 50% or less of the particle diameter of the active material particle.

8. A power storage device comprising an electrode assembly, wherein
the electrode assembly includes
two or more electrodes including at least one positive electrode, wherein each of the electrodes includes a thin metal plate and an active material layer, which includes a plurality of active material particles, the active material particles are formed on a surface of the thin metal plate and have a predetermined average particle diameter, and
a sheet-like separator located between the electrodes, wherein
the electrode assembly has a layered structure in which the electrodes and the separator are stacked or wound,
in at least one positive electrode, the surface of the thin metal plate includes a formation region where the active material layer is located, some of the active material particles are active material particles that are at least partially embedded in the formation region, and
among the active material particles that are at least partially embedded in the formation region, an average distance between centers of two adjacent ones of the active material particles is 60% or greater and 98% or less of the average particle diameter.

* * * * *